INVENTORS
Donald W. Laviana
Eugene K. Arnold
George L. Cooper

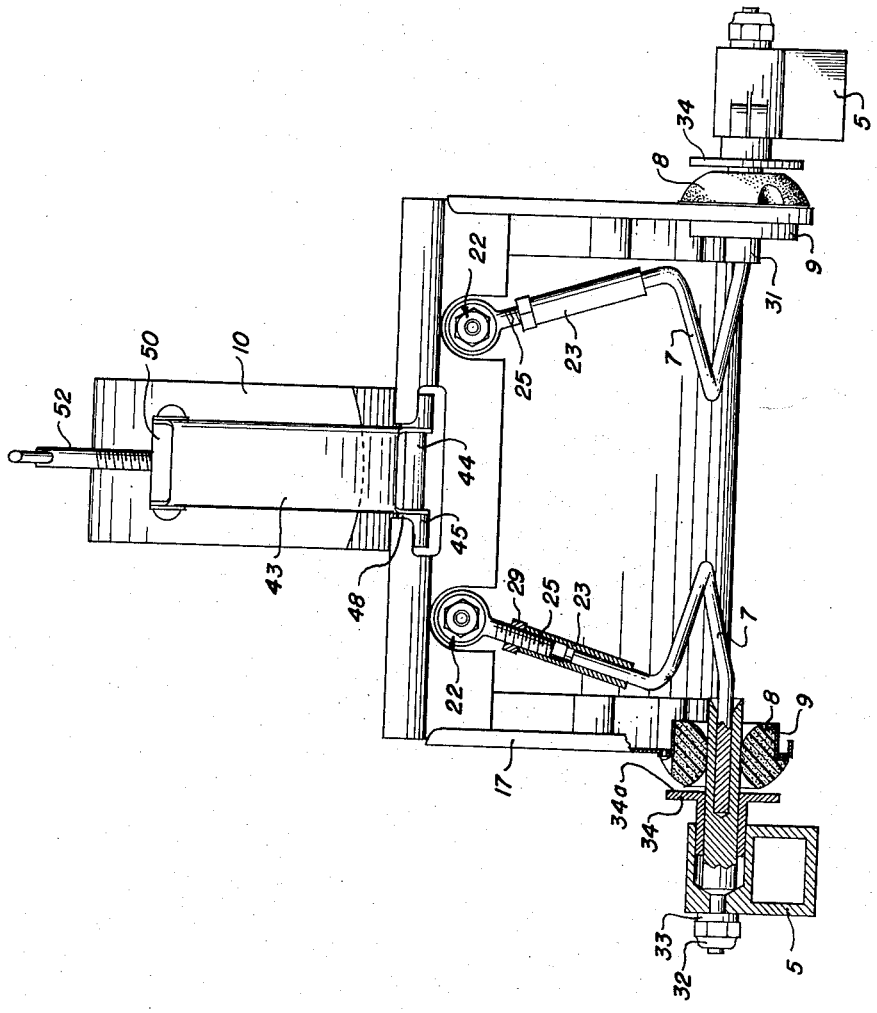

Patented July 27, 1954

2,684,825

UNITED STATES PATENT OFFICE 2,684,825

SHOCK OR VIBRATION ISOLATING MEANS

Donald W. Laviana and Eugene K. Arnold, Kansas City, Mo., and George L. Cooper, Overland Park, Kans., assignors to the United States of America as represented by the United States Atomic Energy Commission Application September 25, 1952, Serial No. 311,404

5 Claims. (Cl. 248—358)

The present invention relates generally to means for isolating objects from shocks or vibration, and more particularly to means which is adapted to provide such isolation and protection regardless of its position or attitude and throughout the temperature range from very low to very high temperatures.

Previous attempts to provide a satisfactory means or device for supporting objects and isolating them from shocks or vibration have been objectionable for various reasons. Some previous devices have been suitable for isolating an object in one position but have been unsatisfactory when turned to other positions or inverted so that the weight of the supported object is effective along a different axis than that of said one position. Where the mounting device is utilized on vehicles of any sort, for example, automobiles, railroad cars, ships, aircraft, or the like, this is a serious objection. For example, some previous devices which afford satisfactory isolation when the weight of a mounted object acts generally perpendicular to a base are unsatisfactory when the device is so oriented that the weight of the object acts along an axis generally parallel to or away from the base.

Another difficulty experienced with some previous devices is that of limiting the extent of motion of the device and a mounted object under conditions of resonance. For example, some previous attempts to limit or damp out excessive motion have objectionably interfered with the yieldable support of the device and an object thereon, others have not provided sufficient damping, others have been unsuitable for use in abnormal orientation of the device in space, and still others have been unsuitable for use throughout comparatively wide temperature ranges.

An object of the present invention is to provide new and improved means for isolating an object against vibration or shocks.

Another object of the invention is to provide new and improved means adapted to isolate an object against vibration or shocks regardless of the position in which the device and any object thereon are disposed.

Another object of the invention is to provide new and improved isolating means adapted to minimize or prevent objectionable travel of a supported object under conditions of resonance.

Still another object of the invention is to provide a new and improved vibration-isolating device which is of light weight.

A further object of the invention is to provide new and improved vibration isolating means that is equally effective throughout a temperature range from very low to very high temperatures.

A still further object of the invention is to provide new and improved vibration isolating means that is of relatively simple and sturdy construction and requires a minimum amount of inspection and maintenance.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawings,

Fig. 4 is a side elevational view of the device shown in Figs. 1-3, with portions broken away and sectionalized.

Figure 1:
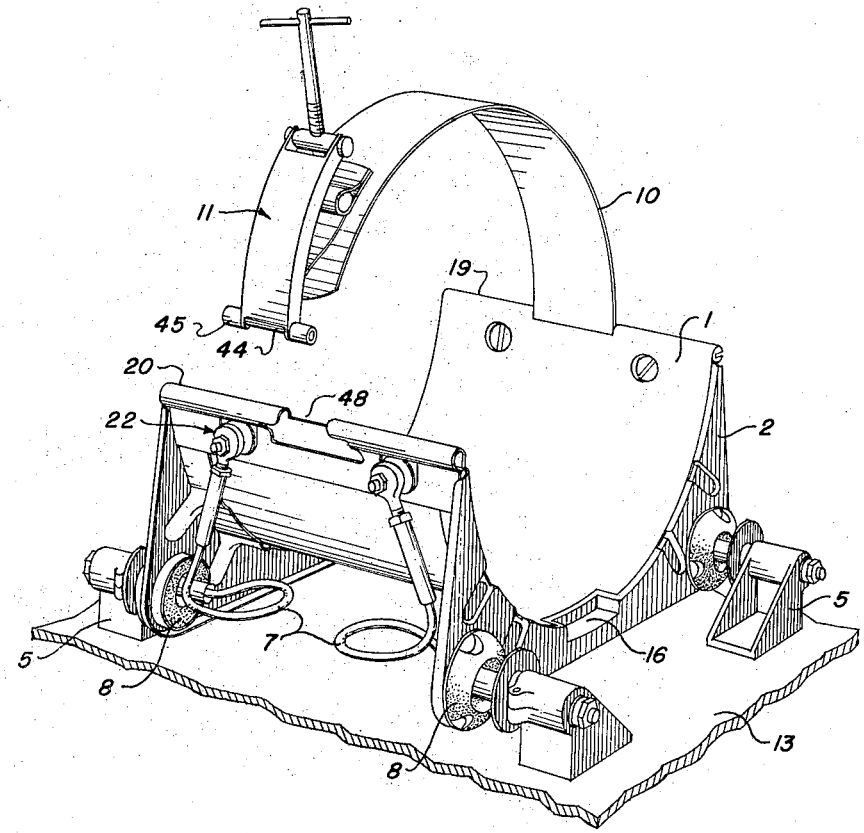
Fig. 1 is a perspective view showing a preferred embodiment of the invention.

As shown, the present device comprises generally a cradle 1 having laterally projecting flange portions 2 that are operatively connected with attachment brackets 5 through the intermediation of a plurality of similar rodlike springs 7 and annular resilient combined spring and damping members 8. The latter members 8 and the rodlike spring members 7 cooperate with each other in minimizing transmission of shocks or vibration from a foundation or base to the cradle and any object thereon, as well as in damping out excessive movement of the cradle, particularly under resonant conditions. A strap 10 and connecting means 11 are provided for retaining an object on the cradle 1 and for facilitating quick insertion or removal of the object.

While the cradle and strap are illustrated as of substantially semicircular configuration to retain a cylindrical object, they may be of any appropriate configuration suitable for the particular object to be held, for example, oval, rectangular, etc.

Figure 2:
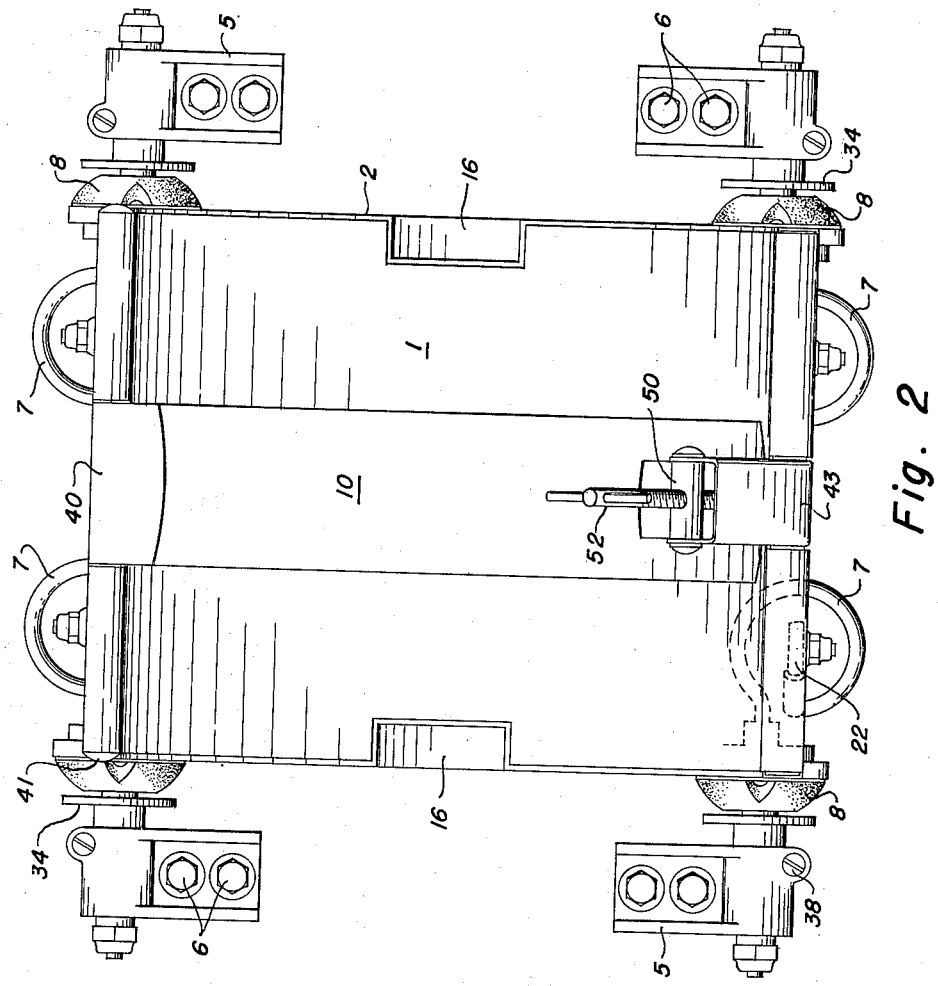
Fig. 2 is a top plan view of the device illustrated in Fig. 1.

The brackets 5 may be bolted, riveted or otherwise attached to any suitable base, and such is indicated in Fig. 1 by the reference character 13. For illustration, bolts 6 are shown in Fig. 2.

The present device will now be described in greater detail. As shown, the cradle 1 and laterally projecting flanges 2 are integral with each other and may be formed from a single piece of sheet metal provided with suitable strengthening ribs 14. Recesses 16 may be provided for cooperating with complementary projections on the object, to thereby properly orient the object with respect to the mounting device. The flanges may be further strengthened by turning edge portions 17 thereof at an angle to the remainder of the flanges.

Oppositely disposed side edge portions 19 and 20 of the cradle may be turned outwardly, downwardly and inwardly for strength and also to provide means for retaining one end of the strap 10 and the connecting means 11 which is secured adjacent an opposite end of the strap. These turned side edge portions of the cradle will be hereinafter referred to in connection with the description of the retaining strap 10 and connector 11.

The cradle 1 is supported on the spaced brackets 5 by the rodlike spring members 7, which are secured to upper portions of the cradle at opposite sides thereof and at spaced locations on each side. Thus each side of the cradle is firmly supported at two locations.

The upper portions of the rodlike members 7 are preferably connected to the cradle so that when an object is mounted on the device they will be disposed substantially symmetrically about the center of gravity of the object; these connection points also preferably lie in substantially a common plane passing through the four points and the center of gravity of the object.

Figure 3:
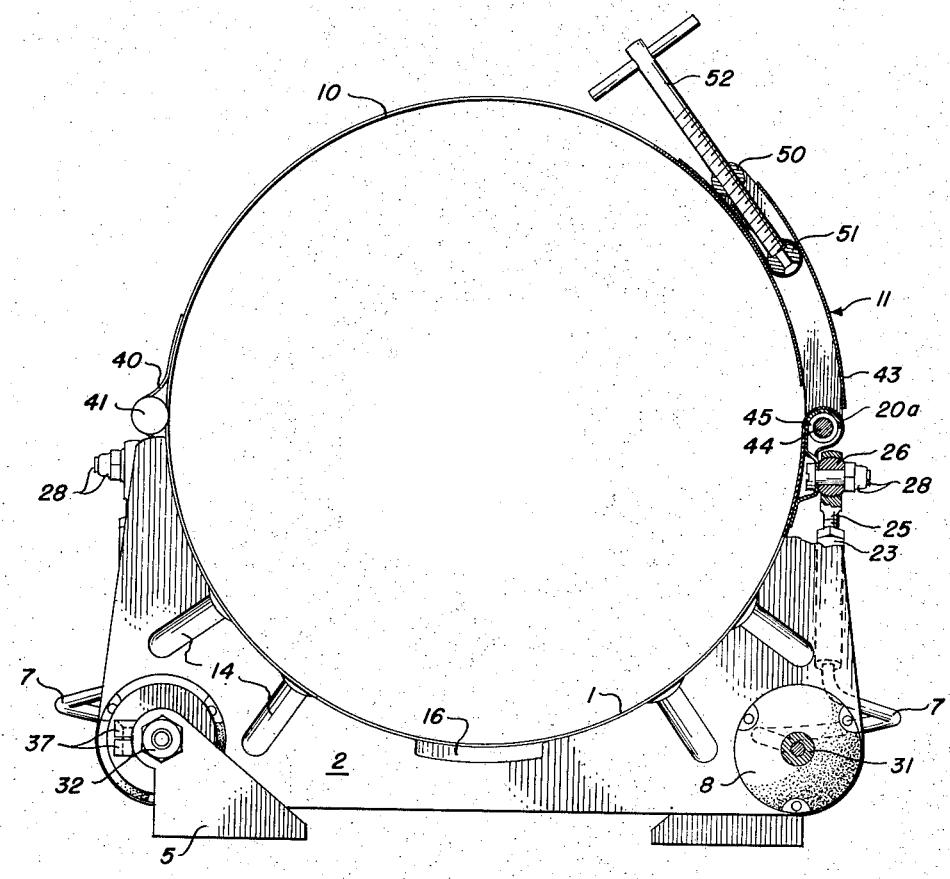
Fig. 3 is an end view of the device shown in Figs. 1 and 2, with portions broken away and sectionalized.

The rodlike members 7 are preferably of suitable spring steel and connect with the upper portions of the cradle through the plurality of similar ball and socket "joints" 22. The details of this ball and socket connection are shown more particularly in Figs. 3 and 4, from which it will be noted that the upper ends of the rodlike members 7 are held by tubular members 23, opposite end portions of the tubular members being threadedly and adjustably engaged with an extension of the socket member 25. Each socket member extends about a "ball" member 26, which is in turn affixed to a portion of the cradle 1 by bolt and nut 28. A locknut 29 may be provided for retaining a desired setting of the tubular member 23 and its cooperating extension of socket member 25.

Each of the four rodlike spring members 7 is preferably in the form of a single convolution and, in the relationship shown, their lower ends extend generally horizontally to facilitate connection with the brackets 5.

The lower end of each rodlike spring member 7 projects through an opening in an adjacent cradle flange 2 and into a retaining sleeve 31. The sleeves extend into openings in their respective attachment brackets 5 and are retained therein by nuts 32 and washers 33, threaded onto outer ends of the sleeve members. The brackets may be provided with any suitable means, for example, bolt or rivet receiving apertures, to facilitate attachment of the device to a base, wall, or other structure.

Each bracket 5 and sleeve 31 carries a collar member 34 that has a surface 34a disposed toward the adjacent cradle flange and the annular resilient member 8 mounted thereon. The collar members 34 cooperate with the annular members 8 to prevent excessive movement of the cradle longitudinally of the sleeves 31.

The hubs of the collar members 34 are exteriorly threaded and cooperate with threaded bores in the attachment brackets, so that the collar members 34 may be rotated to adjust the spacing between their abutment faces 34a and adjacent surface of an annular resilient member 8. Each bracket 5 is provided with a split portion 37, through which extends a locking bolt 38. When a desired collar setting has been obtained, the bolt 38 may be rotated to clamp the split portions 37 against the hub of the collar member 34.

The annular resilient members 8 which cooperate with the sleeves 31 and rodlike spring members 7 to isolate the cradle against shocks and jars, are bonded to metal ring members 9, the ring members being in turn riveted or bolted at spaced intervals to the cradle flanges 2. The central axes of the openings through the resilient members 8 are substantially in alignment with longitudinal axes of the sleeves 31 and engage exterior surfaces of the sleeves substantially uniformly throughout their circumferences. Adjustment to obtain this desired alignment is facilitated by the cooperating threaded tubular members 23 and socket members 25 which support upper ends of the rodlike members 7.

The interior diameter of the opening through an annular resilient member 8 prior to projection of a sleeve 31 therethrough is preferably about .080 inch less than the outside diameter of the sleeve 31. This contributes toward firm and uniform interengagement of the resilient members and sleeves 31 throughout their circumferences to thereby dampen out objectionable motion of the cradle 1 and an object thereon in directions transversely of the sleeves 31. This interengaging of the resilient members 8 and sleeves 31 also tends to dampen objectionable movement of the cradle generally lengthwise of the longitudinal axes of the sleeves 31.

For best results throughout wide temperature ranges, the annular resilient members 8 are preferably comprised of silicone rubber having a durometer hardness of about 20 to 35. This material changes only a few durometers in hardness throughout wide temperature ranges, which is highly desirable where the device may be subjected to temperatures ranging from −100° F. to +200° F. A suitable silicone rubber material is that sold by the Arrowhead Rubber Company of Downey, California, under the name "Silastic 250."

The four steel rodlike spring members 7 in the configuration of single convolution are so disposed with relation to the supporting cradle and brackets that regardless of direction of pull of the weight of an object on the cradle, the low resonant point and high isolation efficiency are obtained. The kinematic effect obtained effectively minimizes pitching or rocking motions. When the brackets 5 are secured to a foundation the rodlike spring members 7 carry the major portion of the weight of an object or unit mounted on the cradle 1.

The cooperating effect produced between annular silicone rubber members and the single convolution springs makes the annular members and springs a parallel spring arrangement that is highly effective in supporting an object and isolating it against shocks and vibration. The principal support of load on the steel springs results in light loading of the cooperating silicone rubber members; thus the latter are not likely to suffer objectionable damage or loss of resilience even though subjected to relatively long periods of operation or storage. Under static load conditions or under small travel normally experienced in the frequency range of isolation, little rubber is subjected to reaction or load sustaining. However, under the large excursion encountered at resonance, a larger portion of the resilient annular members experiences loading and effective damping is obtained through the excellent damping properties and relationship provided by the cooperation of resilient annular members and steel springs.

An additional highly desirable feature provided by the present mounting system is that of safety, for it may be readily seen that even if one or all of the steel springs should break, the cradle and any object thereon are still held captive.

As previously mentioned, means is provided for quickly clamping an object in the cradle and for releasing it when desired; as shown, this means comprising the strap 10 and connecting means 11. One end of the strap 10 is provided with a loop 40 which extends about a pin 41, the pin 41 being retained in position adjacent the upper side edge portion 19 of the cradle by a "loop" formed integrally with the cradle. Of course, any other suitable means may be provided for retaining the end of the strap. With this construction the strap may be rotated clear of the cradle 1 so that an object can be readily placed thereon. When the object is positioned on the cradle the strap may be swung back over it and locked into position at its opposite or free end.

As shown, the connecting means 11 provided for locking or releasing the free end of the strap 10 into holding or releasing position comprises a buckle member 43 carrying on its free end a cross shaft 44 provided with bearing collars 45. The outer end portion of the buckle member 43 may project into a cut-out 48 at the edge portion of the cradle and the end portions of the cross shaft 44 with collars 45 project beneath an outturned flange or bead 20a. The flange or bead 20a is suitably recessed so that the cross shaft and its collars 45 may be readily positioned beneath or removed from outwardly projecting retaining shoulders of the bead 20a.

The inner end of the buckle member 43 has rotatably secured thereto a swivel nut 50 and the latter connects with a trunnion 51 on the strap 10 through a threaded adjusting handle 52. When the threaded handle is rotated in one direction (Fig. 3) the swivel nut 50 and trunnion 51 are forced apart from each other so as to decrease the combined effective length of strap and buckle member and thereby pull the strap 10 firmly against an object on the cradle. When the handle is rotated in an opposite direction the swivel nut and trunnion 51 move toward each other to increase the effective combined length of strap and buckle member and thereby lessen the force with which the strap 10 presses down against the object in cradle 1.

It is not necessary, however, to "lock" and "unlock" an object in each instance by rotating the handle 52. Once a setting has been obtained for a particular size of object, the object may be locked onto or released from the cradle by swinging the handle about an axis passing through the trunnion 51. For example, an object held in position by the strap and buckle may be released by swinging the handle bodily toward the right (Fig. 3); this allows the swivel nut 50 to swing away from the underlying strap 10 so as to increase the effective length of the combination provided by the strap 10 and buckle member 43. In effect a toggle action is provided. When the handle is thus swung to the right and the effective length of the retaining means increased, the cross shaft 44 and its collars 45 may be readily moved out from beneath the bead 20a. To lock an object on the cradle the cross shaft 44 and its collars may be disposed beneath the bead 20a and the handle swung upwardly and toward the left to the relationship illustrated in Fig. 3, in which position the strap and buckle member 43 clamp the object securely into position.

It will be seen that the present invention provides a new and improved device for supporting objects in such manner that they are effectively isolated from vibration and shocks. The device is adapted to so isolate the supported object regardless of its attitude or orientation in space and is adapted to dampen excessive vibrations, particularly under conditions of resonance, throughout wide temperature ranges. The device is of relatively simple and sturdy construction and is adapted to withstand any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention we claim:

1. A device of the class described comprising the combination of a cradle adapted to support an object, a plurality of spring means each operatively connected adjacent one end thereof with said cradle at spaced locations to support it, attachment brackets operatively connected with said spring means adjacent opposite ends thereof, a plurality of rigid extensions carried by said cradle each terminating adjacent to but spaced from said spring means, and generally annular rubbery members carried by said plurality of rigid cradle extensions encircling and operatively engaging portions of said spring means at locations adjacent but spaced from said brackets to cooperate with said spring means in supporting said cradle and minimizing vibration thereof.

2. A device of the class described comprising the combination of support means adapted to carry an object, a plurality of spring means having normally upper ends operatively connected with said support means at spaced locations to support it and having generally horizontally disposed lower ends, attachment brackets operatively connected with said generally horizontally disposed lower ends of the spring means, generally annular resilient means of substantially uniform compressibility throughout its circumference fixedly secured to portions of said support means encircling and operatively engaging portions of each of said horizontally disposed lower ends at locations adjacent said brackets and having terminal portions facing toward said brackets and spaced from said portion of the support means to which they are secured to cooperate with said spring means in yieldably sustaining said support means and minimizing vibration thereof, and collar members carried by said brackets and adjustable toward and away from said terminal portions of the resilient means to thereby control the extent of movement of said support means longitudinally of said lower ends of the spring means.

3. Shock and vibration minimizing means comprising a cradle having laterally projecting flange means secured thereto, a plurality of brackets adjacent said flange means each containing a bore oriented generally perpendicular to a portion of said flange means, apertured rubbery members affixed to said flange means and aligned with the respective bracket bores, a recessed member extending into each bracket bore and through the aperture of an adjacent rubbery member with exterior walls of the recessed member in firm circumferential engagement with adjacent walls of the aperture of the rubbery member due to said rubbery member apertures having preformed diameters less than external preformed diameters of said recessed members, resilient rods each with substantially a single convolution intermediate its ends having one end secured to a respective one of the recessed members, and ball and socket assemblies secured to the cradle adjacent opposite ends of the respective resilient rods and adjustably connected with said opposite ends of the rods whereby the resilient rods are adjustable to symmetrically position the apertured rubbery members about said recessed member.

4. A device of the class described comprising the combination of a cradle adapted to support an object, a plurality of spring means having normally upper ends operatively connected with said cradle at spaced locations to support it and having generally horizontally disposed lower ends, attachment brackets operatively connected with said generally horizontally disposed lower ends of the spring means, a plurality of rigid extensions carried by said cradle each terminating at locations adjacent to but spaced from said lower ends of the spring means, and generally annular compressible rubbery members carried by said rigid extensions encircling and in circumferential frictional engagement with said horizontally disposed lower ends at locations adjacent said brackets whereby movement of the cradle in any direction transversely of said lower ends subjects a portion of said annular rubbery member to compression for cooperation with said spring means in supporting said cradle and minimizing vibration thereof.

5. A device as claimed in claim 4, in which said plurality of spring means each comprises a resilient rod having, in horizontal plan projection, substantially a single convolution intermediate its ends.

References Cited in the file of this patent

UNITED STATES PATENTS

| Number | Name | Date |
|---|---|---|
| 1,611,795 | Warner | Dec. 21, 1926 |
| 1,823,203 | Knecht | Sept. 15, 1931 |
| 2,063,063 | Trott et al. | Dec. 8, 1936 |
| 2,342,577 | Gehman | Feb. 22, 1944 |
| 2,493,172 | Tuck et al. | Jan. 3, 1950 |
| 2,631,873 | Tuck | Mar. 17, 1953 |

OTHER REFERENCES

Product Engineering—April 1946.
Product Engineering—March 1952.